United States Patent [19]

Meinhardt

[11] Patent Number: 4,910,742
[45] Date of Patent: Mar. 20, 1990

[54] METHOD AND APPARATUS FOR THE COOLING OF GAS LASERS

[75] Inventor: Yehuda Meinhardt, Kiriat Bialik, Israel

[73] Assignee: Galram, Haifa, Israel

[21] Appl. No.: 191,582

[22] Filed: May 10, 1988

[30] Foreign Application Priority Data

May 15, 1987 [IL] Israel .................................... 82545

[51] Int. Cl.$^4$ ............................................. H01S 3/00
[52] U.S. Cl. .................................................... 372/37
[58] Field of Search ....................... 372/37, 34, 35, 61, 372/88, 87, 83

[56] References Cited

U.S. PATENT DOCUMENTS

| | | | |
|---|---|---|---|
| 3,516,012 | 6/1970 | Huchital | 372/37 |
| 3,582,817 | 6/1971 | Gilson | 372/37 |
| 3,670,262 | 6/1972 | Hallock et al. | 372/37 |
| 3,993,965 | 11/1976 | Alves et al. | 372/37 |
| 4,007,430 | 2/1977 | Flecher et al. | 372/37 |
| 4,504,954 | 3/1985 | Güers et al. | 372/37 |
| 4,530,096 | 7/1985 | Berkefi et al. | 372/37 |
| 4,550,408 | 10/1985 | Karning et al. | 372/37 |
| 4,641,316 | 2/1987 | Collins et al. | 372/37 |
| 4,649,547 | 3/1987 | Carlson et al. | 372/37 |
| 4,715,039 | 12/1987 | Miller et al. | 372/37 |
| 4,755,999 | 7/1988 | Macken | 372/37 |
| 4,788,686 | 11/1988 | Mentel | 372/37 |

OTHER PUBLICATIONS

"Instability of the Positive Column in a Magnetic Field and the 'Anomalous' Diffusion Effect", B. B. Kadomstev and A. V. Nedospasov, J. Nucl. Energy, Part C: Plasma Physics, 1960, vol. 1, pp. 230-235, Pergamon Press Ltd.

"Multiple Pass Unstable Resonator for an Annular Gain $CO_2$ Laser", V. A. Seguin, H. J. J. Seguin, C. E. Capjack, S. J. Nikumb, and H. Reshef, Applied Optics, Nov. 1, 1986, vol. 25, No. 21, pp. 3825-3829.

"Stable Resonator with Phase-Unifying Coupler for High-Power Lasers", Koji, Yasui, Masaaki Tanaka and Shigenori Yagi, Applied Phys. Lett. 52(7), 15 Feb. 1988, pp. 530-531.

"Multipass Coaxial Radiofrequency discharge $CO_2$ Laser", J. G. Xin and D. R. Hall, Optics Communications, vol. 58, No. 6, Jul. 15, 1986, pp. 420-422.

Primary Examiner—Frank Gonzalez
Attorney, Agent, or Firm—Weingarten, Schurgin, Gagnebin & Hayes

[57] ABSTRACT

The invention relates to improved gas lasers with an increased power output compared with conventional lasers of a similar size. There is established an axial magnetic field and an electric field either parallel therewith or perpendicular thereto, the interaction of such fields resulting in a substantially increased convective instability of the gas discharge, resulting in an increased heat transfer to the walls of the laser. The laser discharge is in the axial direction parallel with the magnetic field. The components of the laser, except for the means of establishing such magnetic and electric fields of predetermined strength, are of a conventional nature. The invention further relates to a method of operating a gas discharge laser in such a manner that there is established an axial magnetic field and an electric one either orthogonal or parallel therewith, resulting in a strong convection, heat transfer to the walls and dramatically increased power output.

13 Claims, 7 Drawing Sheets

METHOD AND APPARATUS FOR THE COOLING OF GAS LASERS

FIELD OF THE INVENTION

The invention relates to an improved type of gas discharge laser. Furthermore, it relates to a highly efficient method of cooling of the plasma which results in a substantially increased power output, compared with conventional lasers of the same size, and to means for effecting such cooling. The method of cooling is based on the use of an electric field orthogonal or parallel with respect to an axial magnetic one which is preferably essentially homogeneous, the parameters of these being chosen in such a manner that there is established a plasma flow adapted to provide the required heat transfer to the walls and heat removal from the critical active region of lasing.

One of the specific embodiments of the invention relates to a coaxial gas discharge laser sealed at both ends with mirrors, there being provided means for superimposing an axial magnetic field of adjustable intensity, and a radial electric one orthogonal to the essentially homogeneous magnetic field, or an axial magnetic field and also an axial electric field, the laser being operated under conditions of a predetermined gaseous flow pattern adapted to effectively cool the critical gain region of the laser, resulting in a highly increased power output.

BACKGROUND OF THE INVENTION

A number of publications appeared by the authors V. A. Sequin et al. of the Department of Electrical Engineering of the University of Alberta, Edmonton, Alberta, Canada (see *Applied Optics*, Vol. 25, No. 21, pg. 3825–3829, Nov. 1, 1986 and references) describing a configuration similar to that of the invention but inventively distinct from it. They use a non-homogeneous magnetic field to avoid end effects, produced by the anode itself (anode/solenoid), the cathode being a multi-element hollow button electrode. Both anode and cathode are cooled by a dielectric fluid. The gas discharge is nonself-sustained, magnetically stabilized, photoinitiated, impulseenhanced, electrically excited (MAGPIE) and the $CO_2$ gas mixture flows through the gain region in a closed cycle with the aid of axial flow fans. The magnetic field is about 83 (Gauss) and its only purpose is to stabilize the electrical gas discharge and increase the power loading to their device. The magnetic field is a weak and non-homogeneous one.

SUMMARY OF THE INVENTION

The invention relates to improvements in gas-discharge lasers, resulting in a substantially increased power output compared with conventional ones of the same size. The invention further relates to a method of operating such a laser system so as to effectively remove heat from the critical region, resulting in an increased power output, allowing for the full use of the interelectrode region for lasing. High power loadings can be induced in the gain region without arc formation. Better molecular pumping takes place due to the increased path of the electrons.

The invention further relates to gas discharge lasers provided with means for establishing a predetermined type of gas circulation resulting in a greatly enhanced heat removal, resulting in an improved laser performance and higher power output for a given laser size.

With coaxial gas-discharge lasers, sealed at their ends with suitable mirrors, there are provided means for establishing an essentially homogeneous axial magnetic field, means for varying such field strength; there being provided means for establishing a radial or orthogonal electric field, said electric field being adapted to ionize the gaseous medium of the laser and causing a population inversion in the gain region, said gaseous mixture (plasma) being cooled by a forced convection caused by the interaction of the weakly ionized plasma, with the magnetic and electric fields. When the magnetic field strength is increased beyond a certain critical value, $B_{crit}$, there results a very steep increase of power output.

The increase of power output can be by a factor of about 5 times, and in some cases even 10 times or more, compared with similar lasers devoid of the specific cooling means of the present invention. Lasers of the type of the present invention can be operated in a pressure range from about 3 to about 200 torr or more, magnetic fields applied vary between the lower limit of $B_{crit}$ to more than 10000 gauss; the electrical voltage applied varies between about 100 V to about 1000 V or more.

For example, a $CO_2$ laser operated at a pressure of 20 torr can be operated with an applied voltage of 600 V between anode and cathode (distance of 20 mm), with an axial magnetic field of about 300 gauss and up to about 5000 gauss.

Although applicable to a variety of laser types and laser configurations, the invention will be illustrated in detail with reference to a couple of specific designs, which are to be construed in a non-limitative manner. Gaseous discharge lasers according to the invention, of substantially increased power output compared with conventional ones of similar size comprise essentially a suitable discharge tube, an optical resonator, a cathode and an anode adapted to establish between these an electric field of predetermined orientation and strength and a magnet adapted to establish a magnetic field with force lines essentially orthogonal or parallel to those of the electric field, the magnetic field being an axial one. Advantageously, means are provided for establishing a continuous gas flow, or for replenishment of the gaseous medium.

According to one of the embodiments concentric tubular electrodes are used, one being an anode, the other a cathode, which also define the discharge tube. This can contain a gas or gaseous mixture of predetermined, generally low pressure. There can be provided means for circulating such gas or gaseous mixture through the discharge tube. The system can also be sealed off. Means are provided for establishing an electric field (E) between the anode and the cathode by applying an electric voltage to the two electrodes, the voltages being generally in the range of from about 100 V to about 1000 V. This radial or axial electric field results in the ionization of the gas or gases in the discharge tube and in a population inversion. In order to avoid an "edge effect" there are advantageously used tubes the ends of which are flared.

There are provided conventional cooling means for cooling the electrodes, such as a fluid circulation through the electrodes and/or the use of heat pipes for heat removal. According to the invention a substantially enhanced cooling effect is attained by establishing a forced convection of the gaseous mixture which is due to the interaction of the electric field and of the magnetic field on the ionized entities and the "Lehnert-Hoh" effect for weakly ionized plasmas, also termed "current convective instability of the weakly ionized plasma".

When an elongated tubular discharge tube is used, the forced convection starts at certain values of the magnetic field, and such forced convection results in a substantially enhanced removal of heat of the plasma and in a substantially increased power output from such laser system.

The invention further relates to a method of laser operation, resulting in an enhanced power output, which comprises forming a weakly ionized plasma in a lowpressure discharge tube laser confirguration by means of a radial or axial electric field, and superimposing on said system a magnetic field with an essentially uniform magnetic induction (B) which is essentially parallel to the axis of the tube, the electric and magnetic fields being adjusted in such manner so as to establish a forced circulation of the gaseous mixture (plasma) resulting in an enhanced cooling and increase of power output of the laser.

The invention is applicable to a wide variety of laser systems, such as systems based on $CO_2$, $CO$, $NO_2$, eximers, etc. The magnetic field can be established by a permanent magnet, or it can be created by a solenoid. The electric field is created by applying a DC voltage to the anode and cathode. Instead of the constant DC voltage and magnetic field, it is possible to use a combination of an AC or pulsed current, with corresponding, in-phase magnetic field, it is possible to use a combination of an AC or pulsed current, with corresponding, in-phase magnetic field. It is clear that in case of a parallel electric and magnetic fields E and B, such Lorenzian forces arise above $B_{crit}$ changing their path from anode-to-cathode to a helical orbit around the tubular axis. As this path is of increased length it results in multiple collisions between electrons and molecules, increasing population inversion. The application of a strong magnetic field increases the azimuthal velocity and brings about secondary flows "Taylor Cell" or helicoidal paths, the changeover to such flow pattern taking place at a critical value of magnetic induction where the plasma flow solution reaches a bifurcation point. Furthermore, the application of such a magnetic field results in an "apparent pressure", P, which optimizes the E/P factor for optical pumping of the gas molecule.

The other components of the laser system are conventional ones: the optical resonator may comprise two mirrors perpendicular to the axis of the tube, one being a 100% reflecting one, the other being partially reflecting and partially transmitting. Lasers of the invention can be operated with either external or internal cavities. When an external resonator is used, the tube is sealed at its two ends, there being provided suitable windows such as ZnSe windows, which can be centered or off-center and which can also be positioned at a Brewster angle. The size of the windows will vary as desired, and they can be of a size covering only part of the active region and up to a size corresponding to the full size of such region, such mirrors being located outside the tube with their optical axes extending through the maximum gain region. When an internal resonator is used, the mirrors take the place of the windows of the lateral closing members.

Various configurations of laser systems can be used, and a specific one is illustrated in the following with reference to some of the Figures.

The main feature of the invention is the highly efficient cooling of the gas or gas mixture in the discharge tube (plasma) which makes it possible to use a very much increased power input for a given size of such tube, and which results in a very pronounced increase of power output for a laser of given size.

The lasing systems of the invention are characterized by the compactness of size, simplicity of construction and inexpensive components, such as power supply due to low voltages used.

The homogeneous or uniform magnetic induction or field allows the full use of the entire interelectrode space for lasing and high power loads can be induced in the gain region without resulting in arcing.

There generally exists a critical value of B, "$B_{crit}$", at which the secondary flow starts, and an increase of the magnetic induction beyond this value makes possible a vast increase in power output.

BRIEF DESCRIPTION OF THE DRAWINGS

The invention is illustrated by way of example only with reference to the enclosed schematic drawings, which are not according to scale and in which.

DETAILED DESCRIPTION OF THE INVENTION

Figure 1A:
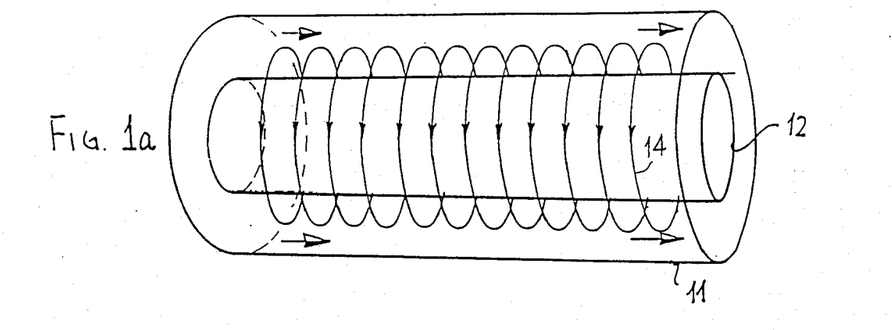
FIG. 1a, 1b and 1c - illustrate the flow pattern of a weak plasma under the influence of electric and magnetic fields of varying intensity.
Figure 1B:
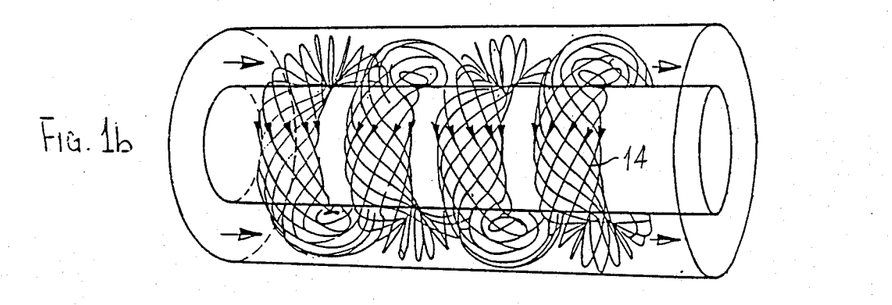
Figure 1C:
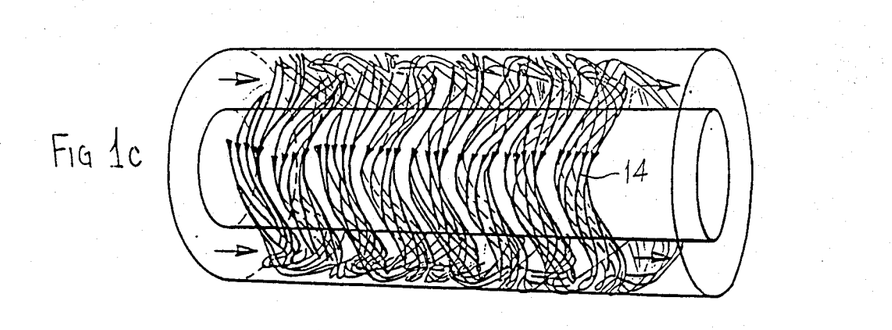

As shown in FIG. 1a, 1b and 1c respectively, a low-gas pressure discharge tube of a laser system of the invention comprises two concentric electrodes 11 and 12, 11 being an anode, and 12 a cathode, said electrodes being connected to a suitable DC source not shown providing a voltage of the order of from about 100 V to about 1000 V or more. The resulting radial electric field lines are designated as $E_r$ and provide an electric radial field of desired strength in the positive column of the discharge. A solenoid or permanent magnet, not shown, is used to produce a magnetic field, advantageously of adjustable field strength, the magnetic induction lines being essentially parallel with the tubular axis, and which is designated as B. The gas or gaseous mixture may be confined between the electrodes by closing the ends.

The gaseous species (one or more gases) between electrodes 11 and 12 are ionized and the combination of the electric and the magnetic field results first (at a weak magnetic force) in a circumferential path indicated in FIG. 1a; an increase of such magnetic field resulting in a changeover to the flow pattern 14 of a mixed circulation that conducts heat radially as shown schematically in FIG. 1b "Taylor Cells"; a still further increase of the magnetic field resulting at a certain value in the creation of a flow pattern of the Taylor-Cell type shown in FIG. 1c, which flow results in a vastly increased heat transfer from the plasma to the heat-removal elements (outer cells) of the system.

The main elements of a laser system of the invention are illustrated with reference to FIG. 2. The laser system comprises in combination a gaseous discharge tube defined by the anode 21 which is a tubular member of internal diameter $d_2$, and a concentric cathode 22 of external diameter $d_1$, defining the gas discharge passage 23 in which there is present a gas or gaseous mixture at a predetermined pressure.

The gas, for example, may be $CO_2$, $CO$, $NO_2$, an eximer or others. The metallic anode 21 is advantageously a stainless-steel cylinder with a Rogovsky or similar profile flange 24 to avoid end effects of the weakly ionized plasma in the gain region 23. There is provided a further tubular member 25 defining a fluid jacket around the anode 21, through which there is circulated a cooling medium 26. Instead there can be provided a coaxial heat-pipe for such cooling purposes. Said tubular member 25 is surrounded by the magnet 27, which can also be cooled by the cooling medium 26. This magnet system 27 can be a permanent magnet, a Bitter magnet, a solenoid or a superconducting magnet. Its design will be such that it will produce an essentially homogeneous magnetic induction B parallel to the axis 28 of the electrode 22 of the gaseous laser tube in the gain region 23. The magnet can be a permanent one or an adjustable one. The magnetic induction vector B ought to be of at least a predetermined intensity, or higher than such critical value $B_{crit}$, which is a function of the tube length L, the effective diameter of the discharge tube $(d_2-d_1)$, the discharge current $I_D$, between the electrodes the gaseous pressure in the discharge tube and the viscosity of the plasma mixture. Without being bound by the theory, the inventor believes that the field strength $B_{crit}$ can be decreased when the aspect ratio is increased. The value $B_{crit}$ increases with decreasing pressure. There are provided tubes 29 and 30, which are preferably made of a non-metallic material, which can be used to circulate a gas or gaseous mixture through the discharge tube region 23, at a given rate of flow, to avoid dissociation of the lasing molecules. Also the cathode 22 can be made of stainless steel or another non-corrosive metal, with a Rogovsky or similar profile flange 31 to avoid end effects. The cathode 22 is cooled by a fluid circulated through region 32 or it can be a heat pipe with Rogovsky flanges 31. The cathode 22 can also be a tungsten wire which can be cooled by the Peltier effect.

At the ends of the anode 21 there are provided dielectric cylinders 33 and 34, respectively, and instead of these there may be provided enamel layers of the same configuration, which extend from the end of the anode (Rogovsky profile) to the end of the tube. A catalyst can be optionally applied to cylinders 33 and 34 to decrease dissociation of the gas molecules in sealed-off operations.

Figure 4:
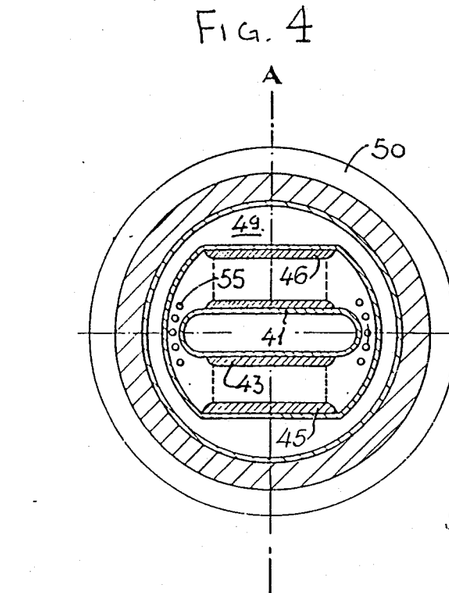
FIG. 4 - illustrates another laser system according to the invention in partial cut, in axial cross-sectional vies.
Figure 5:
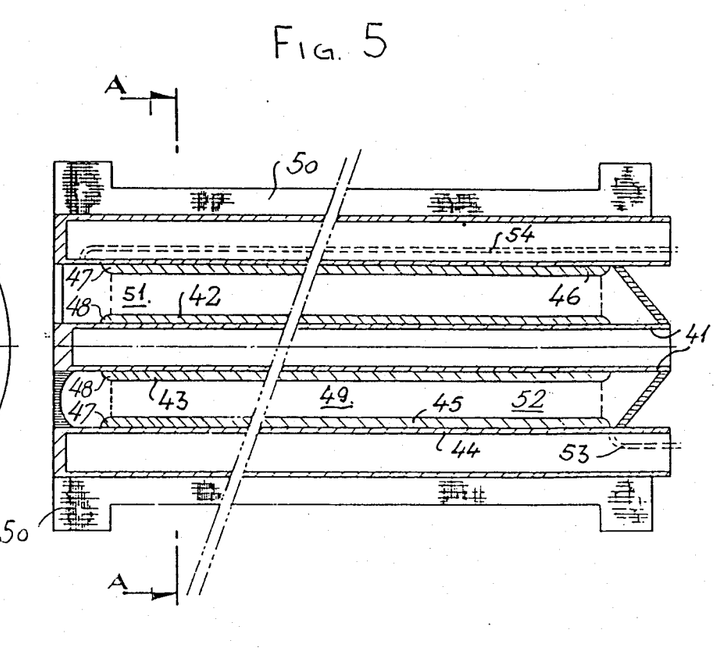
FIG. 5 - is a side sectional view of FIG. 4 along A—A.
Figure 6:
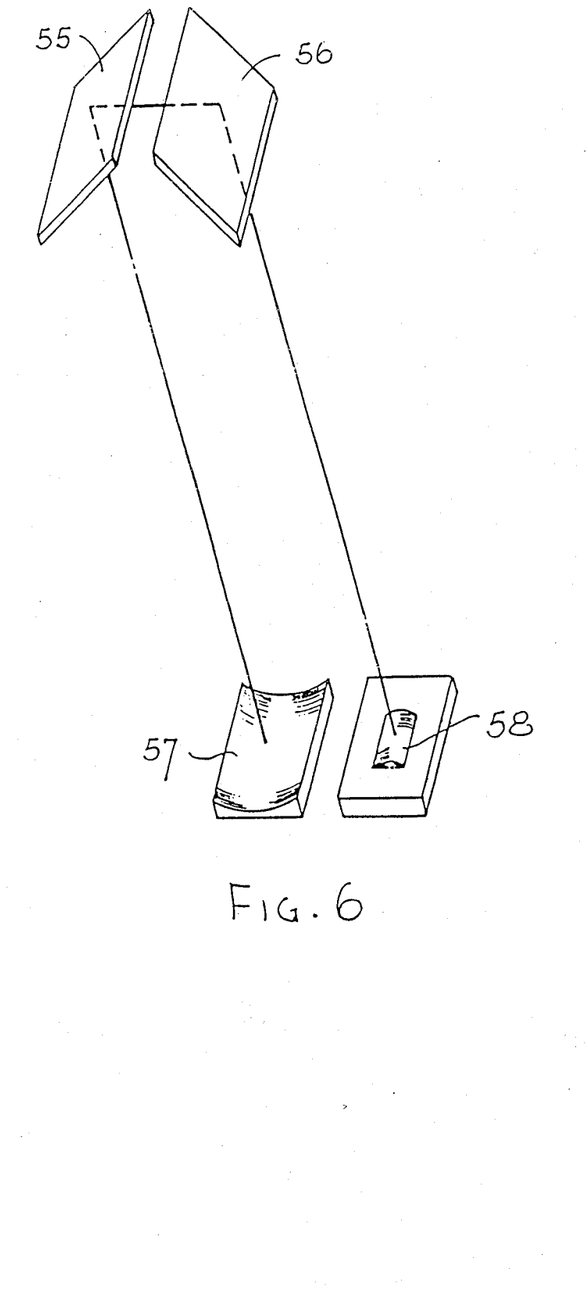
FIG. 6 - illustrates a mirror configuration of a laser system of the invention.

The laser system illustrated in FIG. 4 and FIG. 5 comprises in combination a central fluid conduit 41, to which there are attached two electrodes 42 and 43, serving as anodes, there being provided a tubular surrounding structure 44, there being attached to its inner upper and lower walls two cathodes 45 and 46 respectively, the borders of which have a certain Rogovsky type flanges 47 and 48, the anodes and cathodes being made of a non-corrosive metal alloy such as stainless steel. Inside the fluid-conduit 41, which is made of a dielectric material, water of another suitable cooling fluid is circulated. Also in the space 49 a cooling liquid is circulated. There is provided a magnet 50 which is coaxially superimposed on the laser structure and which provides a coaxial magnetic field of field strength B. There exist two gain regions, 51 and 52, in which there is provided a gas or gaseous mixture at a predetermined pressure. Such can be circulated via pipes 53 and 54, or replenished as required via such pipes. There may be provided a plurality of heat pipes 55 for heat removal. The magnet 50 can be a permanent magnet or a solenoid. A DC voltage is applied to the anodes and cathodes establishing an electric field between these, the magnetic field being orthogonal respective the electric field. The resulting Lorentz forces cause a circulation of the plasma through regions 51 and 52, whereby heat is circulated to and removed mainly via heat pipes 53 and 41, 55, 49. The intensity of the magnetic field is not critical in this special configuration and even a rather weak field results in a pronounced power output increase. As shown in FIG. 6, the resonator is folded by two flat mirrors 55 and 56, having a 100% reflectivity which are of rectangular shape and which are at an angle of 90° with each other at axial ends of regions 51 and 52. At the opposite ends there are provided a metallic total reflectivity mirror 57 with cylindrical curvature and rectangular shape. There is further provided an out-put coupler mirror 58 with predetermined reflectivity so as to optimize the laser output of the gain region. There can also be used an unstable folded cylindrical resonator configuration with a cylindrical output lens 58 as illustrated in FIG. 6. In a similar manner, in FIG. 2, there are provided at the ends of the cathode 22 dielectric cylinders 35 and 36, respectively, or corresponding enamel or similar coatings, with a good seal to the cathode. At the end of the region 23 between the anodes/cathodes there are provided a resonator mirror 37 and a partially reflecting output mirror 38. The distance S of the cylinders 33, 34 35 and 36 is chosen so as to avoid sputtering on the mirrors 37 and 38. There exists a choice of various configurations of the resonator, such as, for example:

a. Mirror 37 being a total reflecting one with enhanced reflection coatings, mirror 38 being a partially reflecting one (torroidal) with a predetermined transmissivity to optimize the small signal gain in the resonant cavity.

b. A multipass configuration as described by J. G. Xin and D. R. Hall, Optics Communications 58, 420-6 (1986);

c. An unstable resonator, mirror 37 being a torroidal total reflecting metallic mirror and mirror 38 being a mirror of the type illustrated in FIG. 3.

d. An unstable resonator as described in Appl. Phys. Lett. 52 (7) 02/15/88 by Yasui et al.

Figure 3:
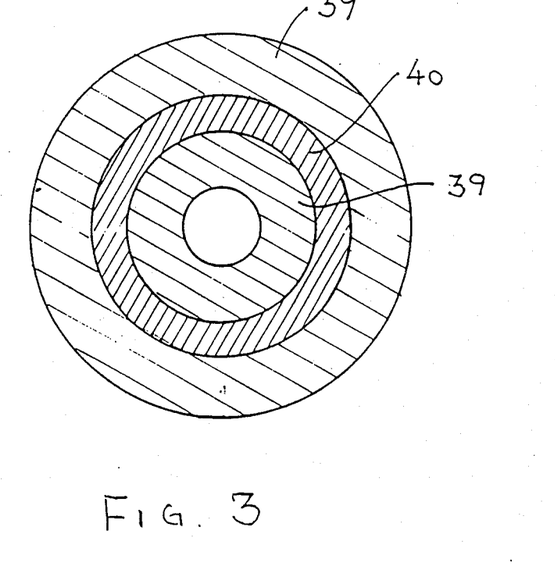
FIG. 3 - is a front view of a mirror used in a system of the invention.

As shown in FIG. 3, the mirror 38 is an outcoupling mirror consisting of two parts, a torroidal window provided with antireflecting coatings defining the sections 39, and a reflecting ring shaped sector 40 (ring mirror) which provides a total reflection and which is in the region of maximum small signal gain.

In all the configurations illustrated above, a vacuum tight seal is provided. The gaseous medium can be continuously circulated, or it can be replenished as required via the conduits 29 and 30 shown in FIG. 2. The laser can also be operated with an AC current, interchanging the functions of the electrodes and by resorting to a change of magnetic field at the same frequency. When the magnetic field is increased, at a certain field strength $B_{crit}$, there results a very steep and pronounced increase of power output, which is approximately linear with the further increase of the magnetic field B. This increase of magnetic field strength implies an increase in the discharge voltage providing the possibility of increased power input for a fixed discharge current. The increased power input results in a very pronounced increase of power output and an increase by a factor of 5 times or more, compared with a similar laser devoid of the plasma circulation and cooling system of the present invention, can be easily attained. In certain cases an increase by a factor of 10 times or even more was attained.

Figure 2:
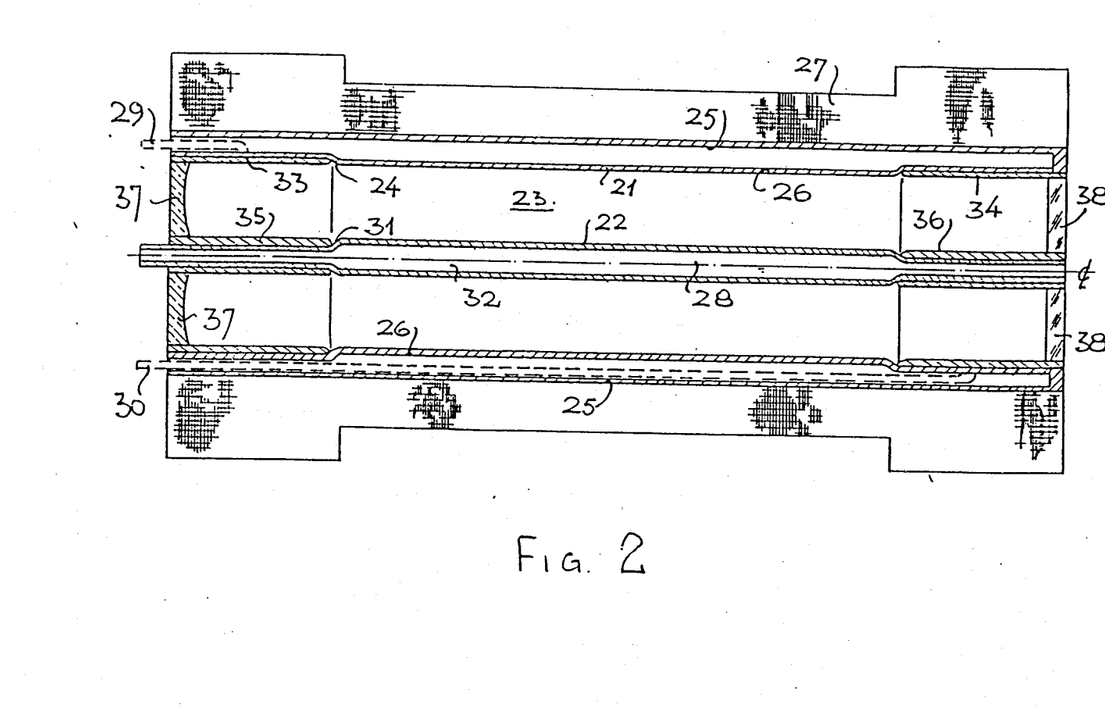
FIG. 2 - is a longitudinal cross-section through a tubular laser system of the invention.

For example, a laser was constructed according to FIG. 2, having an inner diameter $d_1$ of 3 mm, an outer diameter $d_2$ of 31 mm, and a length of gain region 23 of about 310 mm. This was a $CO_2$ laser at a pressure of 20 torr and it was operated at an applied voltage of about 600 Volt and with a magnetic field of larger than 1000 gauss with a discharge current of more than 3 Ampere.

The output power depends on the type of resonator optics used and with well designed conventional resonators there can be attained an output power well in excess of 20 percent of the input power.

When such a high input is used with a sealed-off diffusion cooled laser of similar dimensions of the gain region there generally results the formation of an arc.

Hitherto attempts have been made to attain an efficient cooling by means of expensive and complicated blowers and heat exchangers, but have not given the advantageous results of laser systems of the present invention. Slow flow $CO_2$ lasers cannot sustain such power inputs with a gain volume as set out above in this Example.

Various other configurations and operating conditions were tested and it is clear that the cooling system of the present invention, based on the interaction of an electric field and a magnetic above a certain value on a suitable lasing medium results in a dramatic increase of power output for a given laser size.

While the above described embodiments provide an axial magnetic field 13 orthogonal to the applied electric field, it is possible to orient the two fields in a parallel relationship, with the advantage of a cooling plasma circulation, by reorienting either field.

FIG. 8 illustrates some further embodiments and geometrical configurations according to the present invention.

Figure 7:
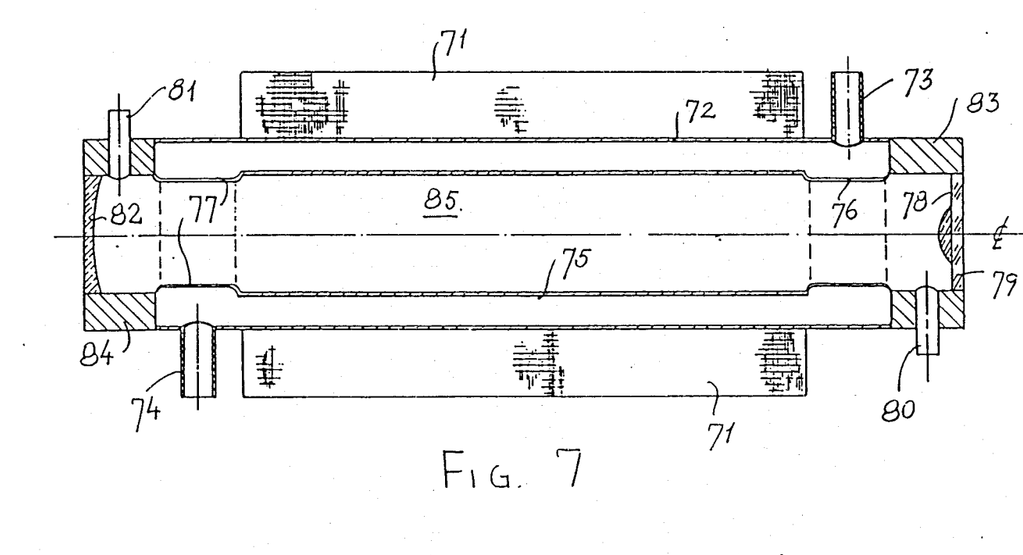
FIG. 7 - illustrates a further laser of the invention.
Figure 8A:
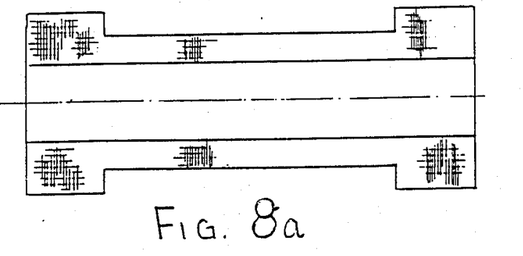
FIGS. 8a to 8f - illustrate different configurations of lasers according to the present invention.
Figure 8B:
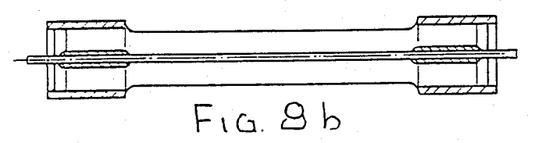
Figure 8C:
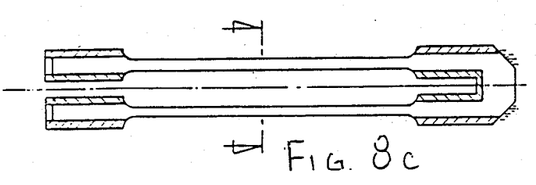
Figure 8D:
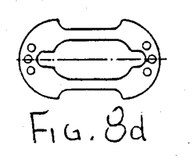
Figure 8E:
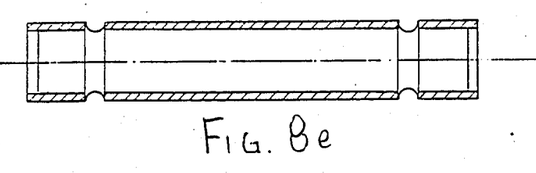
Figure 8F:
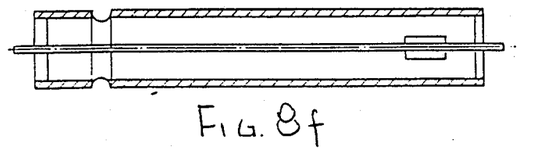

In this Figure:

FIG. 8a is a longitudinal cross-sectional view of a solenoid or permanent magnet with cylindrical bore, into which the different laser configurations can be inserted;

FIG. 8b is a longitudinal cross-sectional view of a laser configuration similar to that illustrated in FIG. 2;

FIG. 8c is a longitudinal cross-section of a different geometrical configuration of a laser similar to that illustrated in FIG. 4;

FIG. 8d is a sectional view taken along the cut indicated in FIG. 8c;

FIG. 8e is a longitudinal cross-sectional view of a hollow cathode similar to that used in the laser illustrated in FIG. 7;

FIG. 8f is a longitudinal cross-sectional view of an anode-cathode assembly of the type designated in literature as P.I.G.-discharge type, for use in lasers of the invention.

Although applicant does not want to be bound by a specific scientific theory, it is believed that the physical principle of the present invention is the currentconvective instability of a gas discharge as described by L. Lehnert, Report P/146 at the Second U.S.Intern.Conf. on Peaceful Uses of Atomic Energy, Geneva 1958, and which is also explained as "plasma instability" by V. V. Kadomtsev and A. V. Nedospasov in J. Nuclear Energy C 1, 230 (1960). Plasma instability appears at a critical magnetic field strength, $B_{cr}$, and for a magnetic field $B < B_{cr}$ the ambipolar diffusion equations are valid. In the ambipolar diffusion regime the electric field is reduced with an increase of the magnetic field till a value of $B \geq B_{cr}$ where we have an anomalous diffusion of D. Bohm (A. Guthrie & R. Walkerling: The Characteristics of Electric Discharges in Magnetic Fields, McGraw Hill, N.Y. 1949). and the electric field increases again with $B > B_{cr}$. The above principle can be applied to a laser of the type set out in a schematic manner in FIG. 7, which illustrates a laser with an externally water-cooled cylindric bore which is located in a homogeneous axial magnetic field. Anode and cathode are hollow electrodes at the end of the cylindrical bore, where also a simple stable or unstable resonator of spherical parts is arranged and adjusted. For $B > B_{cr}$ the flow pattern of weakly ionized plasma is a helicoidal one, the electrical field being parallel to B for $B < B_{cr}$ and becomes radial and azimuthal component for $B \geq B_{cr}$.

The laser can be a sealed-off one, or one with an open cycle. The main elements of such laser are illustrated with reference to FIG. 7.

In this Figure, 71 designates a permanent magnet or a solenoid which surrounds the laser which comprises a cylinder 72 of a thermally insulating material which defines the exterior part of the laser and of the fluid cooling jacket. 73 and 74 are the output and input ports of the circulating cooling medium. Cathode 77 is a hollow one, as is anode 76, both of which are connected via a cylinder of electrically insulating material which is a good thermal conductor, 75. There is provided a resonator of the unstable positive branch type, there being provided at the ends of the tubular structure spherical mirrors 78 and 82, respectively, 79 being a flat AR/AR coated window. The gas medium can be introduced into the interior of the laser via inlet tube 80 to plasma region 85, and can be withdrawn via exit port 81. The unstable resonator set out, is sustained by the two mirror holders 83 and 84.

It is clear that the above description is by way of exemplification and illustration only and that various changes and modification of the nature and arrangement of parts can be resorted to without departing from the scope and spirit of this invention.

I claim:

1. A method of operating a laser of the gas discharge type which comprises:
   providing a gas discharge tube with a gas or gaseous mixture comprising a plasma at a predetermined pressure;
   establishing an electric field at a certain direction through said gaseous mixture so as to ionize gaseous species in a gain region,
   establishing a magnetic field orthogonal or parallel to the electric field, and homogeneous within the gain region, said magnetic field being an axial one, said magnetic field being greater than a predetermined minimum field strength to produce an interaction of said fields with the ionized species resulting in a circulation of the plasma further resulting in enhanced heat transfer from the gain region which permits an increase in power input and laser output.

2. A method according to claim 1, where the gas or gaseous mixture is confined in an annular space between an a first axially disposed electrode and a second tubular electrode coaxially surrounding the first electrode, the electric field being a radial one, the intensity of electric and magnetic field being such as to result in a circulation of the ionized species in said annular space between the first and second electrodes, and said step of heat transfer including the step of removing heat from the laser.

3. An improved gas discharge type laser system having a substantially increased power output compared with a conventional laser of the same type and dimensions of gain region, comprising:
a gas discharge tube having a lasing region and provided with a gas or gaseous mixture at a predetermined pressure,
means for establishing an electric field at a certain direction through said gas or gaseous mixture,
means for establishing an axial homogeneous magnetic field perpendicular to the electric field, the magnetic field being above a predetermined critical value resulting in a forced circulation of the gas or gaseous mixture,
an optical mirror system with mirrors opposite and facing each other at the ends of the discharge tube, the resulting laser output being parallel to the direction of the magnetic field.

4. An improved gas discharge type laser system according to claim 3, where the gas is confined in an annular space between concentric coaxial tubular members, where the electric field is a radial field, where the magnetic field is essentially an axial field, and where heat removal means are provided for the efficient removal of heat energy from the lasing region.

5. A laser system as claimed in claim 3 further comprising:
two coaxial electrically conducting tubes provided at their ends with Rogowsky type flanges, wherein said lasing region comprises means for confining in the space between said tubes the gas or gaseous mixture at said predetermined pressure;
means for circulating the gas or gaseous mixture;
the electric field establishing means comprises means for applying a radial electric field between the two tubes, the magnetic field establishing means comprises means for establishing a magnetic field orthogonal to said electric field; wherein the mirrors facing said lasing region space are disposed between and at the ends of the tubes; and
heat removal means for removing heat from the lasing region of the laser system during lasing.

6. A laser system according to claim 3, where the pressure is maintained between about 3 to about 200 torr; where the voltage applied varies between about 100 to 1000 Volts and where the magnetic field is between a critical magnetic field and about 10,000 gauss.

7. A laser system according to claim 3, where the magnetic field providing means includes one or more magnets, solenoids, a superconductor magnet and a Bitter magnet.

8. A laser system according to claim 3, further comprising heat removal means comprising fluid heat exchangers or heat pipes.

9. A laser system according to claim 3, where the gaseous medium used is one of $CO_2$, $CO$, $NO_2$, and an excimer.

10. An enhanced power output laser system comprising:
means for defining a region having a longitudinal axis of lasable gas medium within confining walls;
means for applying electric field energization to said region adapted to excite gas medium therein to a lasing condition;
means for applying a magnetic field homogeneously to said region along the longitudinal axis cooperative with said electric field to produce a combined force upon charged particles within said region that induces a circulation of medium components which evacuates heat from said region towards the confining walls of said medium;
optical means for reinforcing lasing of gas within said region.

11. The system of claim 10 wherein said region is elongate and annular and said confining walls comprise inner and outer coaxially arranged tubular members.

12. The system of claim 10 wherein said magnetic field applying means comprises means to apply a magnetic field at a strength above a predetermined field strength below which circulation induced in said region is substantially uniform and above which said circulation becomes of complex helical form inducing rapid gaseous motion between said region and said confining walls.

13. A laser system comprising:
a central elongated member to two faces of which there are applied a first pair of electrodes, a conduit surrounding the elongated member, wherein a second pair of electrodes are applied to inner surfaces of the conduit so as to face the first electrode pair, each of said electrode pairs being attached to the different poles of a direct current voltage source, a gaseous medium at predetermined pressure being provided in the space defined by said conduit and between said electrode pairs, means being provided for circulating such gas or gaseous mixture through said space or for replenishing same, a magnet being provided around the conduit and the central elongated member providing a homogeneous magnetic field orthogonal with said electric field, heat conductive means being provided in said space between the electrode pairs, said electric and magnetic fields causing plasma located in said space during the operation of the laser to circulate in said space giving up heat to the heat transfer means, a suitable conventional optical system being provided for the operation of the laser.

* * * * *

UNITED STATES PATENT AND TRADEMARK OFFICE
CERTIFICATE OF CORRECTION

PATENT NO. : 4,910,742
DATED : March 20, 1990
INVENTOR(S) : Yehuda Meinhardt It is certified that error appears in the above-identified patent and that said Letters Patent is hereby corrected as shown below:

In Column 4, line 32, "vies" should read --view--.

Signed and Sealed this

Second Day of June, 1992

*Attest:*

DOUGLAS B. COMER

*Attesting Officer*   Acting Commissioner of Patents and Trademarks